US011858646B2

(12) United States Patent
Giambartolomei

(10) Patent No.: US 11,858,646 B2
(45) Date of Patent: Jan. 2, 2024

(54) WING DROP FUEL TANK AND PROCESS FOR THE PRODUCTION THEREFOR

(71) Applicant: M.E.RIN SRL, Rome (IT)

(72) Inventor: Enzo Giambartolomei, Rome (IT)

(73) Assignee: M.E.RIN SRL, Rome (IT)

( * ) Notice: Subject to any disclaimer, the term of this patent is extended or adjusted under 35 U.S.C. 154(b) by 0 days.

(21) Appl. No.: 17/310,650

(22) PCT Filed: Feb. 15, 2020

(86) PCT No.: PCT/IB2020/051291
§ 371 (c)(1),
(2) Date: Aug. 16, 2021

(87) PCT Pub. No.: WO2020/165876
PCT Pub. Date: Aug. 20, 2020

(65) Prior Publication Data
US 2022/0119124 A1 Apr. 21, 2022

(51) Int. Cl.
*B64D 37/12* (2006.01)
*B64D 37/08* (2006.01)

(52) U.S. Cl.
CPC .............. *B64D 37/12* (2013.01); *B64D 37/08* (2013.01)

(58) Field of Classification Search
CPC ...................................................... B64D 37/12
See application file for complete search history.

(56) References Cited

U.S. PATENT DOCUMENTS

| 3,101,921 A | * | 8/1963 | Price | B64D 37/12 244/135 B |
| 4,790,350 A | * | 12/1988 | Arnold | B64D 37/12 220/4.15 |
| 5,054,635 A | * | 10/1991 | Kolom | H01L 31/1832 220/4.15 |
| 6,491,255 B1 | * | 12/2002 | Bracken | B64D 37/32 220/4.15 |

FOREIGN PATENT DOCUMENTS

GB 630238 A * 10/1947

* cited by examiner

*Primary Examiner* — Richard G Davis
(74) *Attorney, Agent, or Firm* — Browdy and Neimark, PLLC

(57) ABSTRACT

A wing drop fuel tank it is provided comprising a rigid external casing 1 and a second tank 2 arranged inside said rigid casing 1, said second tank 2 being made of flexible material. A production process of said wing drop tank it is also provided which comprises the following steps: construction of two rigid half-shells 10 and 11, and the subsequent mutual coupling of the former creates a single rigid structure 1; making of a first port and a second port at the upper part of the half-shell 10, said second port having same size of a fuel filling flange 23 on said tank 1; inserting of a second tank 2 made of a flexible material through said first port in said first tank 1; and applying a closing plate 12 at said upper port, said closing plate 12 being removably locked on said tank 1 by means of clamping screws 13 which engage with threaded holes 22 made on a flange 21 integral with said second tank 2.

9 Claims, 1 Drawing Sheet

WING DROP FUEL TANK AND PROCESS FOR THE PRODUCTION THEREFOR

Figure 1:
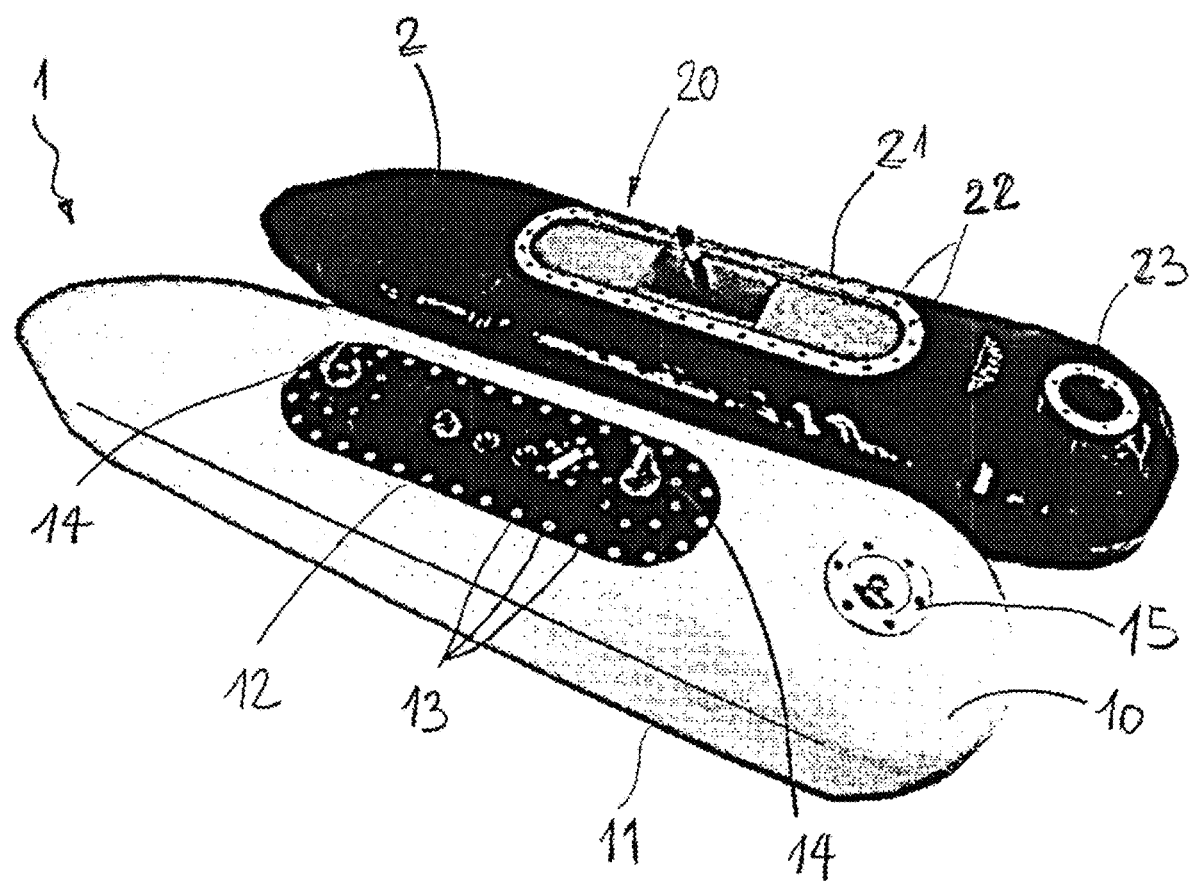

The present invention relates to a wing drop fuel tank for an aircraft or the like and, more precisely, to a wing drop fuel tank for an aircraft which comprises a rigid external protective structure and a flexible internal containment structure.

The invention further relates to the production process of the abovementioned fuel tank.

STATE OF THE ART

As it is known in aviation, a wing drop tank (generally detachable) refers to a removable auxiliary fuel tank external to the fuselage of an aircraft, positioned in a lower wing or ventral region of the aircraft. The external tank it is expendable and often therefore detachable. The use of these wing drop tanks it is typically expected to increase the range of action of aircrafts (planes, or helicopters, and both civil and military aircrafts).

In practice, the fuel contained inside the wing drop tank can be easily transferred to the main tanks.

External tanks have become commonly used on military aircrafts since the Second World War and occasionally also used on civilian aircraft, although they are only dropped in an emergency condition.

Typically, they have an aerodynamic shape and have a rigid fuel containment structure. The rigid structure it is connected to a support fixed on the wing of the aircraft. The support is called strut.

To date, external tanks for aircraft are already known which have a rigid external structure and a flexible structure inside them for the containing of liquid fuel.

For example, patent application GB630238A describes an jettisonable tank for aircraft which includes an internal flexible container/tank, external rigid sections and end covers, all assembled in groups. For the packaging and shipping therefor, the flexible container 25 of each tank it is fixed to its back section 28 and some sections are anchored to the bottom 66 and sides 67, 68 respectively of a wooden transport case.

Further, patent application U.S. Pat. No. 4,790,350A discloses a fuel tank as an auxiliary source of refueling for aircrafts, which includes a flexible fuel storage chamber housed inside the tank, the latter being sectioned and it is designed to be manually assembled or dismantled in a short time on the field using interchangeable components designed to allow maximum efficiency.

All these solutions proposed to date, however, are extremely complex in assembly and also very heavy.

The present invention aims to solve the above highlighted disadvantages.

BRIEF DESCRIPTION OF THE INVENTION

The object of the present invention it is to provide a wing drop tank preferably made of composite material or light alloy and which tank contains a flexible tank inside it.

According to the present invention, the construction of the tank during the production cycle it is greatly facilitated in the assembly of the same.

Hence, the present invention provides a wing drop tank substantially according to the appended claims.

DETAILED DESCRIPTION OF THE INVENTION

A detailed description of a preferred embodiment of the wing drop tank of the present invention will now be provided, given as a non limiting example, and with reference to the single annexed FIGURE, wherein the structure of the wing tank of the present invention it is schematically illustrated.

According to the invention, the wing tank comprises a rigid external casing 1, which it is made up by two rigid half-shells 10 and 11, respectively. Conveniently, the two half-shells 10 and 11 are made of a material suitable for imparting rigidity and lightness to the tank, for example such as the carbon+epoxy composite material.

Further, according to the invention, a second tank 2 it is provided which it is housed inside the two half-shells 10 and 11, said second tank 2 consists of a flexible casing, made of rubberized fabric.

Typically, the second inner tank 2 can in turn contain anti-explosion and anti-splashing materials, suitable for avoiding the dangers due to the presence of saturated vapours and promoting a correct location of the fuel contained therein.

On the other hand, the second tank 2 has a port 20 delimited by a flange 21 integral with the material of the second tank 2, the flange 21 having a series of threaded holes 22 arranged along the perimeter length of the flange 21.

Furthermore, and with a construction similar to the flange 21, a second flange 23 can be provided and relevant to the fuel filling port inside the tank 2.

Similarly, at the top part of the upper half-shell 10 there is a port having same sizes as the flange 21 of the second tank 2.

The description of the production process of the wing drop tank of the present invention will now be provided.

According to the invention, it is provided that two rigid half-shells 10 and 11 are first created. Then the two half-shells 10 and 11 are mutually coupled, and their coupling creates a single rigid structure of tank 1.

Then, at the upper part of the upper half-shell 10, a first port it is obtained, said first port having same size as the size of said flange 21 of the second tank 2.

Further, a second port of same size and corresponding to the filling flange 23 of the tank 1 it is made.

Then, the second tank 2 already assembled it is inserted through the opening in the first tank 1, the insertion it is obtained thanks to the yielding of the flexible material which constitutes the second tank 2.

In this condition, the flange 21 and the flange 23 match with the ports at the upper half-shell 10.

Subsequently, a closure plate 12 it is applied which coincides with the flange 21, the plate 12 having clamping screws 13 which engage with the threaded holes 22 of the flange 21 therebelow.

Between the plate 12 and the internal flange 21 the connecting edge of the port at the half-shell 10 it is clamped so as to obtain a set of members that work synergistically.

Furthermore, the seal between the flange 21 and the half-shell 10, and between the half-shell 10 and the closing plate 12 it is provided by apposition of rubber seals (the latter not shown in the FIGURE).

Supporting means 14 can be applied to the closing plate 12 which allow the hooking of the wing drop tank 1 on the wing strut (the latter not shown in the FIGURE).

Similar to the assembling methods of the plate 12, a filler plug 15 it is assembled on the half-shell 10.

The individual components are manufactured using traditional methods.

More precisely, the two half-shells 10 and 11 are made with the method of laminating pre-impregnated carbon fiber fabrics.

The internal tank 2 it is made and subsequently vulcanized in an autoclave as already known.

The closing plate 12 and the plug 15 are made with traditional mechanical processes.

As an alternative embodiment to the present solution which provides the arranging of two half-shells 10 and 11, an external tank 1 and the second internal flexible tank 2 can be made jointly with the method of co-vulcanization, that is during the same treatment cycle in the autoclave and inside the same mould.

The present invention has several advantages.

A first advantage is given by transportability.

A second advantage is given by the fact that it provides a structure which is easy to manufacture.

A third advantage is given by the fact that it provides a structure with high stiffness and lightness.

The invention claimed is:

1. A wing drop fuel tank comprising a rigid external casing and a second flexible tank arranged inside said rigid casing, said rigid casing having a first access port to the internal volume of said rigid casing, and said second flexible tank it is made of a flexible material, and is internally mounted within said rigid casing,
   wherein said rigid casing consists of a first rigid half-shell and a second rigid half shell,
   wherein said two half-shells are made of a high stiffness and lightness material,
   wherein said second tank is made of rubberized fabric,
   wherein said second internal tank comprises anti-explosion and anti-splash materials.

2. The wing drop fuel tank according to claim 1, wherein said second tank has a first port delimited by a first flange made integral with the material of said second flexible tank, said flange having a series of threaded holes arranged along the perimeter length of said first flange.

3. The wing drop fuel tank according to claim 2, wherein said second flexible tank comprises a second flange related to a fuel filling port for the filling of the fuel into the second flexible tank, and wherein at a region of said first half-shell a second port is disposed corresponding to and having same sizes as said second flange of said second flexible tank.

4. The wing drop fuel tank according to claim 3, wherein said rigid casing comprises a closure plate mounted at said first access port of said casing and being removably locked on said casing by clamping screws.

5. The wing drop fuel tank according to claim 4, wherein said rigid casing comprises a closure plate mounted at said first access port of said casing, and wherein said closure plate is removably locked on said casing by clamping screws which engage with respective threaded holes obtained on said flange integral with said second flexible tank below.

6. The wing drop fuel tank according to claim 1, wherein the two half-shells comprise a carbon-epoxy composite material.

7. A process for the construction of a wing drop fuel tank, comprising the following steps:
   constructing two rigid half-shells;
   coupling said two rigid half-shells to one another creating a single rigid tank;
   making a first access port and a second port at the upper part of one of said half-shell of said tank;
   inserting second flexible tank made of a flexible material through said first access port of said tank, said second flexible tank having two ports each of which comprises a respective first and second flange;
   arranging said second flexible tank inside said rigid tank so that said first and second flanges are matched with said first and second ports at said rigid tank; and
   applying a closure plate at said first upper port of said tank, said closure plate being removably locked on said tank by clamping screws which engage with respective threaded holes integrally formed at said first flange, said first flange being integral with said second flexible tank.

8. The process for the construction of a wing drop fuel tank according to claim 7, further comprising interposing a pneumatic sealing means between said first flange and said half-shell, and between said half-shell and said closure plate.

9. The process for the construction of a wing drop fuel tank according to claim 8, wherein said rigid tank and said second inner flexible tank are jointly realized by covulcanization within the same mould.

* * * * *